(12) United States Patent
Walker

(10) Patent No.: US 8,776,996 B2
(45) Date of Patent: Jul. 15, 2014

(54) INCLINED ROLLER CONVEYING ASSEMBLY FOR HOT FORMED GLASS SHEETS

(75) Inventor: Russell A. Walker, Perrysburg, OH (US)

(73) Assignee: Glasstech, Inc., Perrysburg, OH (US)

( * ) Notice: Subject to any disclaimer, the term of this patent is extended or adjusted under 35 U.S.C. 154(b) by 163 days.

(21) Appl. No.: 13/598,676

(22) Filed: Aug. 30, 2012

(65) Prior Publication Data
US 2014/0061005 A1 Mar. 6, 2014

(51) Int. Cl.
*C03B 13/16* (2006.01)

(52) U.S. Cl.
USPC ............ 198/824; 198/825; 198/829; 193/35 J; 65/370.1

(58) Field of Classification Search
CPC .............................. C03B 35/195; C03B 35/187
USPC ......... 198/780, 782, 824, 825, 826, 829, 817; 193/35 J; 65/370.1
See application file for complete search history.

(56) References Cited

U.S. PATENT DOCUMENTS

| | | | |
|---|---|---|---|
| 5,857,554 A | 1/1999 | Toye | |
| 6,543,255 B2 | 4/2003 | Bennett et al. | |
| 2001/0037929 A1 | 11/2001 | Bond, Jr. et al. | |
| 2002/0108841 A1 | 8/2002 | Roessler et al. | |
| 2011/0247367 A1 | 10/2011 | Nitschke et al. | |

OTHER PUBLICATIONS

PCT International Search Report and Written Opinion Dated Dec. 23, 2013, Application No. PCT/US2013/050988, Applicant Glasstech, Inc., 6 Pages.

*Primary Examiner* — Ramya Burgess
*Assistant Examiner* — Lester Rushin
(74) *Attorney, Agent, or Firm* — Brooks Kushman P.C.

(57) ABSTRACT

An inclined roller conveying assembly (40) includes a horizontally inclined roller (74) having opposite ends respectively supported by first and second supports (64, 66), with one support (64) having an idler bearing (80) and with the other support (66) having a drive coupling (94) that provides rotation of the inclined roller from a horizontal support and drive axis to provide support for the lower surface of an upper portion $G_u$ of a hot upwardly concave formed glass sheet G being conveyed.

10 Claims, 5 Drawing Sheets

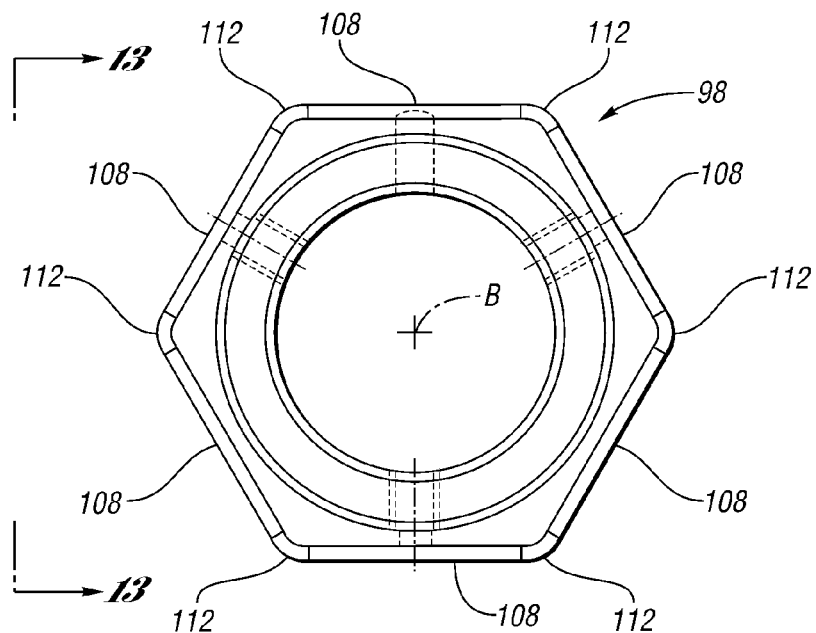
Fig. 12
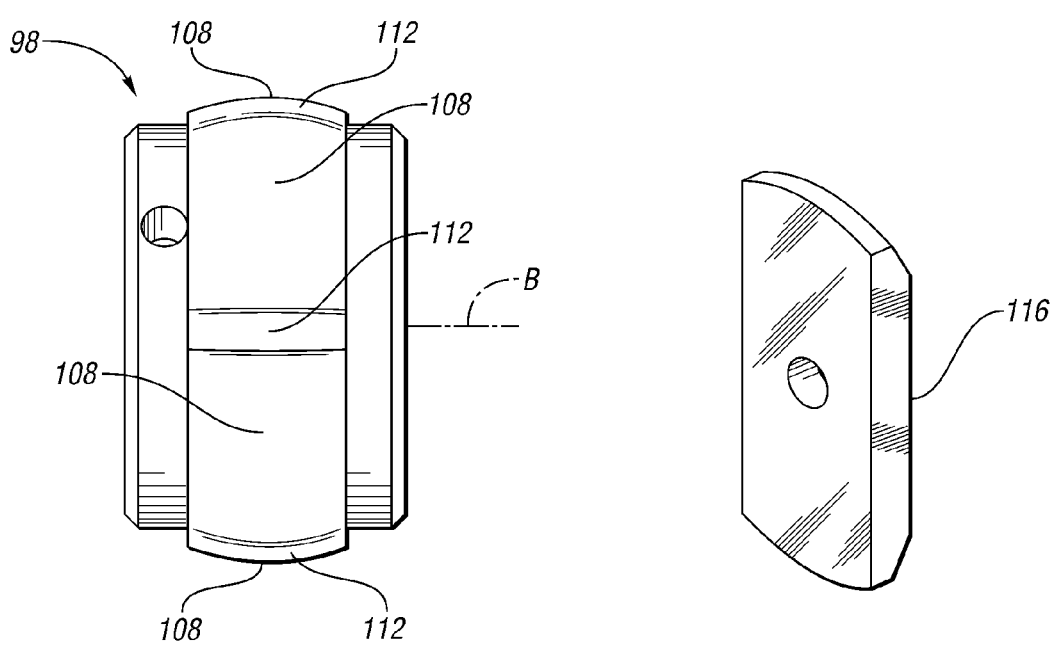
Fig. 13
Fig. 14

INCLINED ROLLER CONVEYING ASSEMBLY FOR HOT FORMED GLASS SHEETS

TECHNICAL FIELD

This invention relates to an inclined roller conveying assembly for hot formed glass sheets.

BACKGROUND

U.S. Pat. No. 6,543,255 Bennett et al., whose entire disclosure is hereby incorporated by reference, discloses a system for glass sheet press bending which in one embodiment is performed after initial preforming of glass sheets in a heating furnace before conveyance to a press bending station for press bending. A lower wheel bed of the system has lower support mounting wheel assemblies that convey each preformed glass sheet from the heating furnace into the press bending station for the press bending. U.S. patent application Ser. No. 12/756,521 filed on Apr. 8, 2010 under the title "Press Bending Station and Method for Bending Heated Glass Sheets" by Nitschke et al., the entire disclosure of which is hereby incorporated by reference, discloses a conveyor for hot formed glass sheets wherein the conveyor includes wheels, horizontal rollers and inclined rollers for conveying formed glass sheets.

SUMMARY

An object of the present invention is to provide an improved inclined roller conveying assembly for hot formed glass sheets.

In carrying out the above object, the inclined roller conveying assembly for hot formed glass sheets is constructed according to the invention to include a pair of supports for mounting in a hot glass sheet processing system with one of the supports having a horizontal support axis and with the other support having a horizontal support and drive axis that is at a different elevation than the horizontal support axis of the one support. A horizontally inclined roller extends between the pair of supports and has a rotational axis that is inclined from the horizontal by an angle α. An idler bearing of the assembly rotatably mounts the inclined roller on the one support at its horizontal support axis, and a drive coupling of the assembly rotatably supports and rotatively drives the inclined roller on the other support at its horizontal support and drive axis so the inclined roller provides support for the lower surface of an upper portion of a hot upwardly concave formed glass sheet being conveyed. The drive coupling includes a female socket that is mounted on either the inclined roller or the other support and also includes a male insert received within the socket and mounted on the other of the inclined roller or the other support. The female socket has a socket axis about which the socket rotates and includes an interior having drive faces that extend parallel to the socket axis, and each drive face has a peripheral central location from which the drive face is inclined slightly outwardly in a peripheral direction by an angle β from a line perpendicular to a radius from the socket axis to its peripheral central location. The male insert has an insert axis about which the insert rotates and includes drive surfaces of the same number as the number of drive faces of the female socket. Each drive surface has a straight shape in a peripheral direction perpendicular to a radius from the insert axis to a peripheral central location along its straight shape, and each drive surface has a round shape along the insert axis with a diameter just slightly smaller than the diameter of a circle through the peripheral central locations of the drive faces of the female socket so as to permit the socket to receive the insert and provide rotational driving between the socket and the insert with an acute angle α between the socket axis and the insert axis.

As disclosed, the female socket has an even number of drive faces and the male insert has an even number of the drive surfaces, specifically, the female socket has six drive faces forming a generally hexagonal shape and the male insert has six drive surfaces forming a generally hexagonal shape.

Also as disclosed, the female socket has recesses located between its adjacent drive faces and extending outwardly therefrom in a radial direction from the socket axis, and the recesses of the female socket as disclosed are round and the male insert has round junctions between its adjacent drive surfaces.

Furthermore, the angles α and β are related by the formula:

$$\beta = \arctangent\left(\frac{1}{\sqrt{3}\ \cosine\ \alpha}\right) - 30,$$

and the angle α is between zero and 25 degrees and the angle β is between zero and 2.5 degrees.

The objects, features and advantages of the present invention are readily apparent from the following detailed description of the preferred embodiment when taken in connection with the accompanying drawings.

BRIEF DESCRIPTION OF THE DRAWINGS

FIG. 12 is an axial end view of the male insert which is received within the female socket as schematically illustrated in FIG. 10.

FIG. 13 is a side view of the male insert taken along the direction of line 13-13 in FIG. 12.

FIG. 14 is a perspective view of a retainer that secures the female socket to its adjacent support in cooperation with a threaded bolt.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
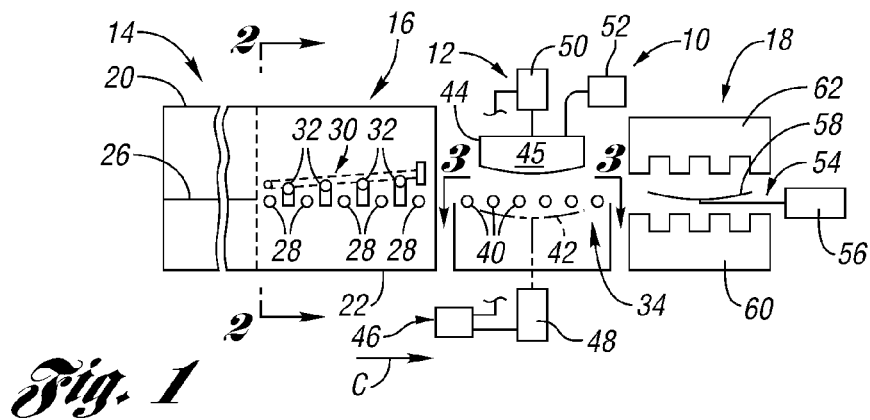
FIG. 1 is a side elevational view of a glass sheet processing system including an inclined roller conveying assembly constructed in accordance with the present invention to convey hot formed glass sheets.

With reference to FIG. 1 of the drawings, a system 10 for processing glass sheets is generally indicated by 10 and includes a forming or press bending station 12. The system 10 includes a furnace 14 having a roll bending station 16 just upstream along a direction of conveyance C from the press bending station 12. Downstream from the press bending station 12 along the direction of conveyance C, the system 10 is illustrated as including a quench station 18 for providing rapid cooling of a formed glass sheet bent by the roll station 16 and the press bending station 12 as is hereinafter more fully described. Instead of a quench station, it is also possible for the system to include an annealing station for slowly cooling the initially formed and subsequently press bent glass sheet to provide annealing of the glass.

As illustrated by continuing reference to FIG. 1, the furnace 14 has entry and exit ends 20 and 22 and includes a heating chamber 24 (FIG. 2) having a conveyor 26 for conveying glass sheets along the direction of conveyance through the furnace from the entry end to the exit end. The conveyor 26 on which the glass sheets are heated can be either a conventional gas hearth or a roll conveyor on which the glass sheets are conveyed during heating from ambient temperature to a sufficiently high temperature to permit bending.

Figure 2:
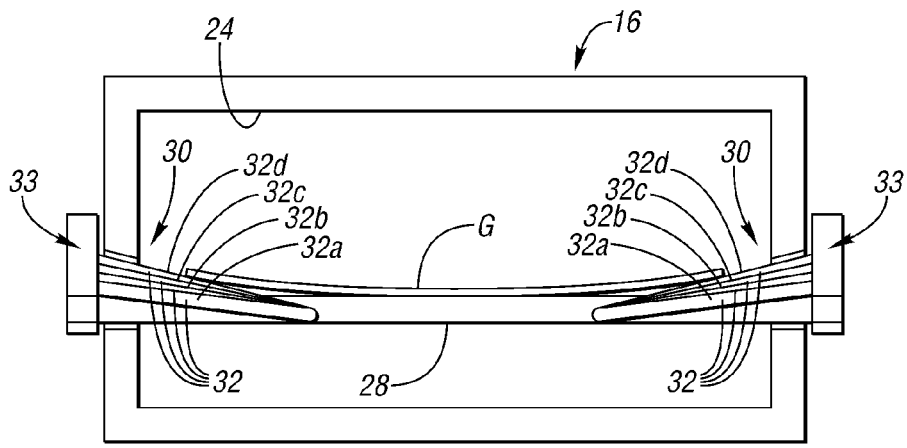
FIG. 2 is a cross sectional view through the system along the direction of line 2-2 in FIG. 1 adjacent an exit end of a furnace of the system and illustrates horizontal and inclined rolls on which each heated glass sheet is conveyed for roll forming prior to exiting the furnace in preparation for subsequent press forming.

The furnace exit end 22 includes the roll bending station 16 which is illustrated in FIG. 2 as having horizontally extending conveyor rolls 28 that are rotatively driven and spaced horizontally within the heating chamber along the direction of conveyance extending laterally with respect thereto to support and convey the heated glass sheets. The roll bending station 16 also includes a pair of sets 30 of bending rolls 32, with the bending roll sets 30 spaced laterally with respect to each other within the heating chamber 24 along the direction of conveyance. Each set of bending rolls 30 is supported and rotatively driven by a drive mechanism 33 with the bending rolls at progressively increasing inclinations along the direction of conveyance as illustrated by reference numerals $32_a$, $32_b$, $32_c$ and $32_d$ in FIG. 2. The conveyance of each heated glass sheet G along the direction of conveyance in cooperation with the bending rolls 32 provides bending or preforming of the heated glass sheet with an upwardly concave shape along a direction transverse to the direction of conveyance as illustrated in FIG. 2.

Figure 3:
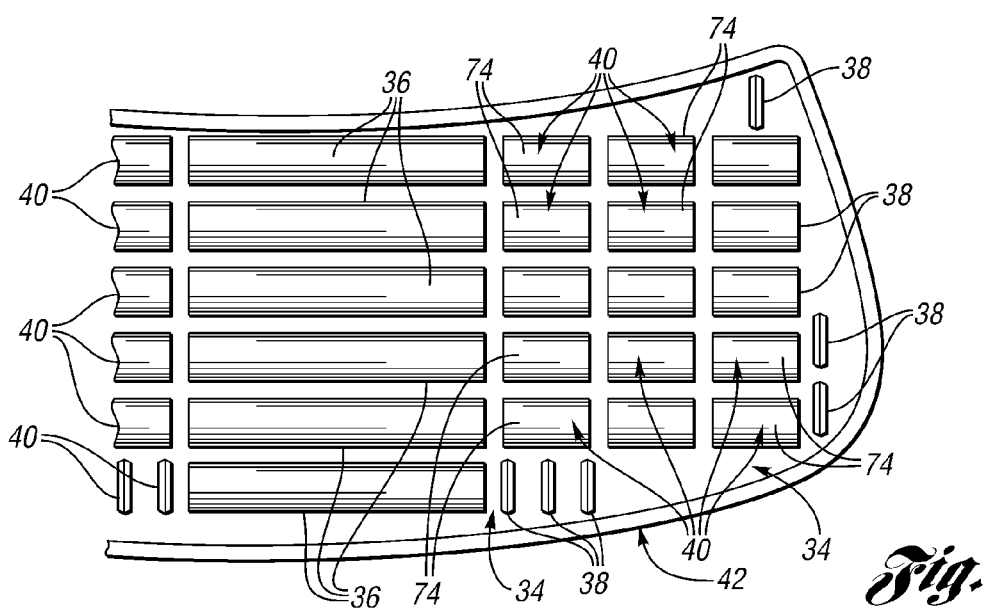
FIG. 3 is a top plan view taken along the direction of line 3-3 in FIG. 1 to illustrate horizontal rollers, wheels and inclined roller conveying assemblies constructed according to the invention to convey hot formed glass sheets which as shown is within a press ring of a press forming station of the system.
Figure 4:
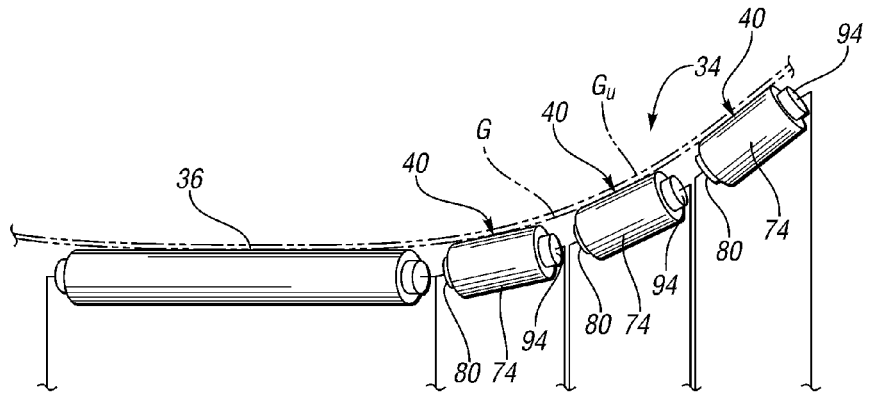
FIG. 4 is a perspective schematic view illustrating one of the horizontal rollers and the inclined roller conveying assemblies of the invention.

With combined reference to FIGS. 1, 3 and 4, the press bending station 12 as previously mentioned is located externally of the furnace 14 downstream from its exit end 22 to receive the roll bent glass sheets from the roll bending station 16. More specifically, the press bending station 12 includes a conveyor 34 for receiving a heated glass sheet to be press bent. The conveyor 34 includes horizontal rollers 36, wheels 38 and inclined roller conveying assemblies 40 the latter of which is constructed in accordance with the present invention as is hereinafter described. The conveyor 34 conveys the hot formed glass sheets G into the press bending station 12 above an upwardly concave lower mold ring 42 and below an upper mold 44 having a downwardly convex forming surface 45. A controller 46 operates lower and upper actuators 48 and 50 that respectively move the lower mold ring 42 and upper mold 44 upwardly and downwardly toward each other to lift the hot glass sheet from conveyor 34 and provide press forming of the glass sheet to a design shape which may include curvature in transverse directions.

After the press forming, the controller 46 moves the lower mold ring 42 and upper mold 44 downwardly and upwardly, respectively, away from each other as a vacuum source 52 draws a vacuum at the forming surface 45 of the upper mold 44 to support the press formed glass sheet. A shuttle 54 of the quench station 18 is then moved by an actuator 56 to move a quench ring 58 toward the left below the upper mold 44. Termination of the vacuum provided by the vacuum source 52 may then be accompanied by a supply of pressurized gas to the upper press mold surface 45 to release the glass sheet onto the quench ring 58 and the shuttle actuator 56 then moves the shuttle 54 back toward the right to the position illustrated such that the quench ring 58 and the press formed glass sheet thereon are located between lower and upper quench heads 60 and 62 which respectively supply upwardly and downwardly directed quenching gas that rapidly cools the glass sheet to provide toughening thereof that increases its mechanical strength.

It should be appreciated that while the press station illustrated has a quench station, it is also possible for the press station to function without any quench station, such as with annealing as is the case when manufacturing laminated windshields for vehicles.

One end of each of the horizontal rollers 36 and each of the wheels 38 is supported and rotatively driven about a horizontal axis by a wheel assembly of the type disclosed by U.S. Pat. No. 6,543,255 Bennett et al., the entire disclosure of which has been incorporated by reference, and the other end of the horizontal roller is supported by an idler wheel assembly. These wheel assemblies are supported by elongated rails extending along the direction of conveyance and supported by jacks that permit vertical adjustment for different curvatures of glass sheets to be conveyed.

Figure 5:
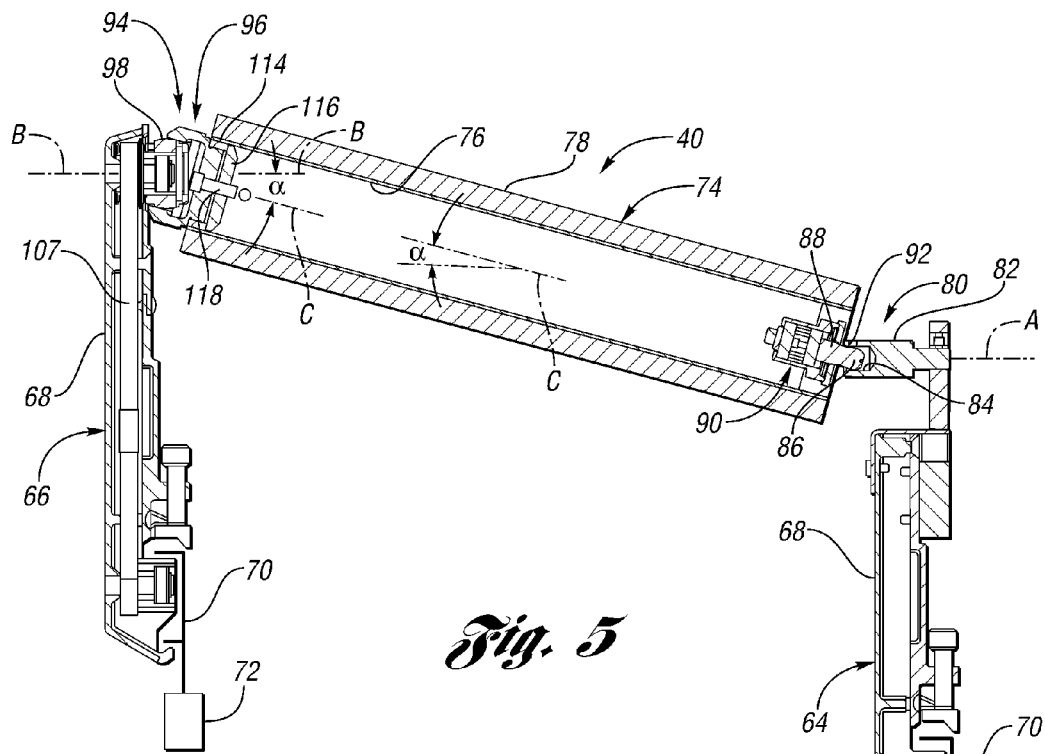
FIG. 5 is an elevation view taken in section through one of the inclined roller conveying assemblies to illustrate its construction.

With reference to FIG. 5, the inclined roller conveyor assembly 40 of this invention includes a pair of supports 64 and 66 for mounting within a hot glass sheet processing system such as the type described above with one of the supports 64 having a horizontal support axis A and with the other support 66 having a horizontal support and drive axis B that is at a different elevation than the horizontal support axis A of support 64. While the horizontal support axis A is illustrated at a lower position than the horizontal support and drive axis B as illustrated, it is also possible for these respective elevations to be reversed. The supports 64 and 66 include housings 68 that are generally of the type disclosed by the aforementioned U.S. Pat. No. 6,543,255 and are mountable on schematically indicated rails 70 which can be adjusted vertically by jacks 72 to provide the difference in elevation. A horizontally inclined roller 74 extends between the pair of supports 64 and 66 and has an inclined rotational axis C defining an angle α with the horizontal to provide support for the lower surface of an upper portion $G_u$ of a hot formed glass sheet G being conveyed with an upwardly concave shape as shown in FIG. 4. The idler roller as disclosed includes an internal metal tube 76 and an outer high temperature fabric type coating such as an aromatic polyamide fiber.

Figure 6:
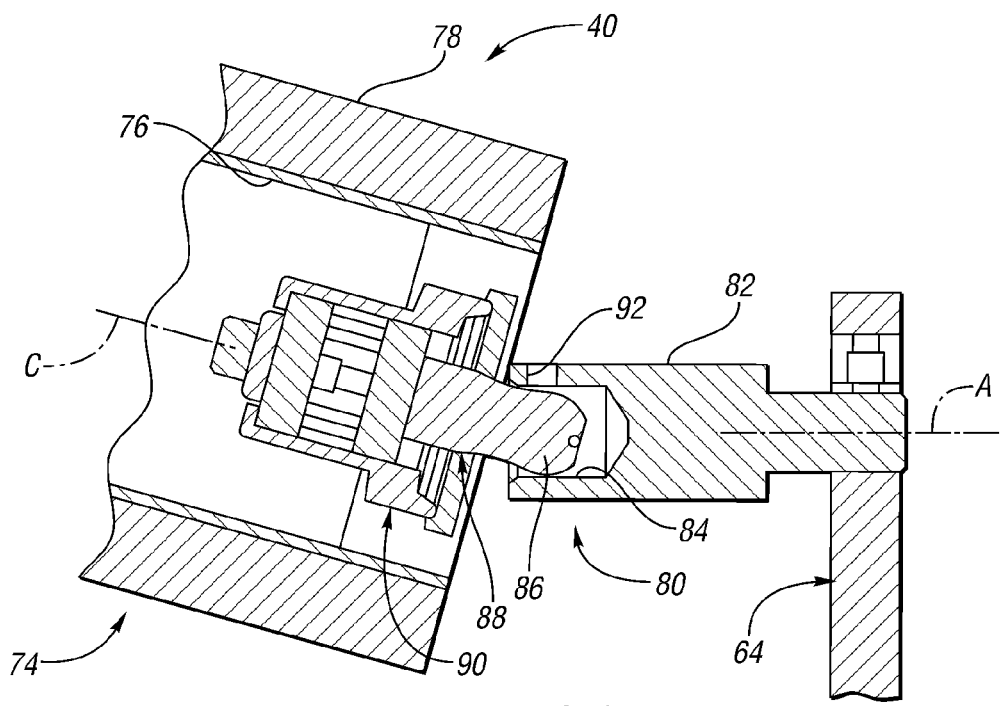
FIG. 6 is an enlarged view of a portion of FIG. 5 illustrating an idler bearing that supports one end of the inclined roller for rotation about its inclined rotational axis.

As shown in FIGS. 5 and 6, the support 64 having the horizontal support axis A includes an idler bearing 80 that supports the adjacent end of the horizontally inclined roller 74. This idler bearing 80 includes a receptor 82 mounted on the upper end of the support 64 extending along the horizontal support axis A and having a round cylindrical opening 84 that receives a partial ball end 86 of a projection 88 supported by a mount 90 on the adjacent end of the metal tube 76 of the inclined roller 74. A set screw 92 or the like maintains the ball end 86 within the opening 84. This idler bearing 80 thus permits adjustment of angle between the horizontal support axis A and the horizontally inclined axis C of the inclined roller 74.

Figure 7:
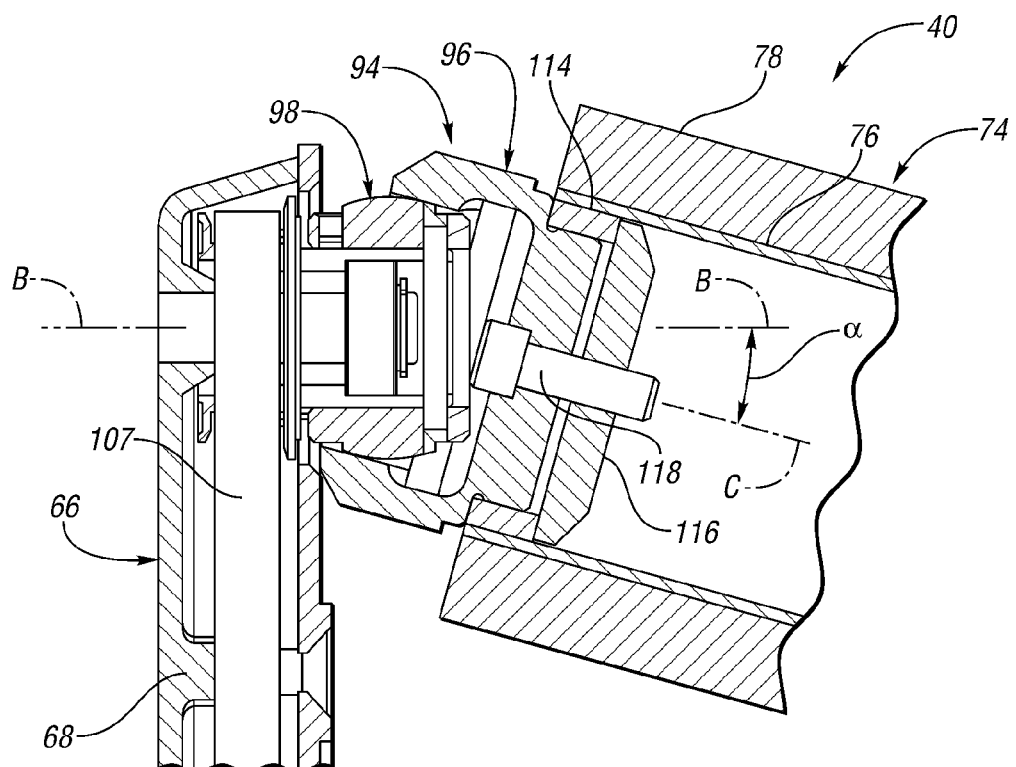
FIG. 7 is also an enlarged view of a portion of FIG. 5 and shows the other end of the inclined roller which is supported and rotatively driven by a drive coupling.

As shown in FIGS. 5 and 7, the inclined roller conveying assembly 40 also includes a drive coupling 94 that rotatably supports and rotatively drives the inclined roller 74 on the other support 66 at its horizontal support and drive axis B to provide conveyance of the upper portion $G_u$ of the hot upwardly concave formed glass sheet G as shown in FIG. 4.

Figure 8:
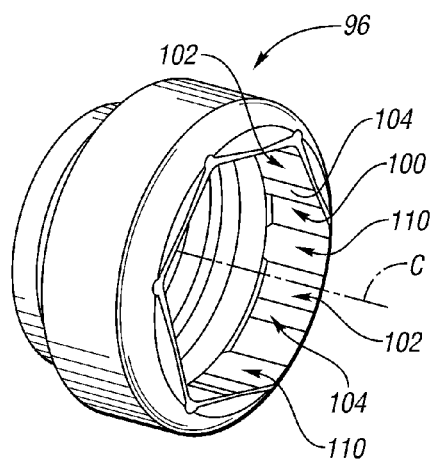
FIG. 8 is a perspective view of a female socket of the drive coupling.
Figure 9:
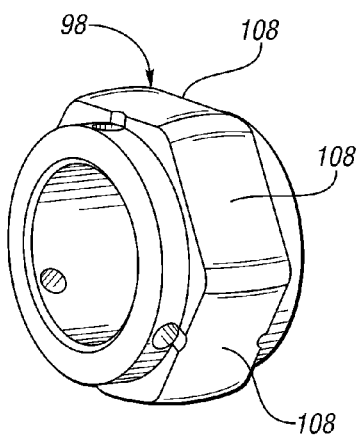
FIG. 9 is a perspective view of a male insert of the drive coupling which is received within the female socket as shown in FIG. 5 to provide the rotational driving.

The drive coupling 94 as shown in FIGS. 5, 7 and 8 includes a female socket 96 that is illustrated as being mounted on the adjacent end of the inclined roller 74 for rotation about the inclined axis C, but the drive coupling may also be mounted on the support 66 along its support and drive axis B. The drive coupling 94 also includes a male insert 98 as shown in FIGS. 5, 7 and 9, that is received within the female socket 96 and as shown is mounted on the support 66 along its support and drive axis B to provide support and rotational driving of the female socket 94 along its horizontally inclined rotational axis C. As previously discussed with the female socket, it is also possible for the male insert 98 to be mounted on the adjacent end of the inclined roller 74 with the female socket 96 mounted on the support 66 to likewise rotatively drive the inclined roller 74 about its horizontally inclined support axis C.

Figure 10:
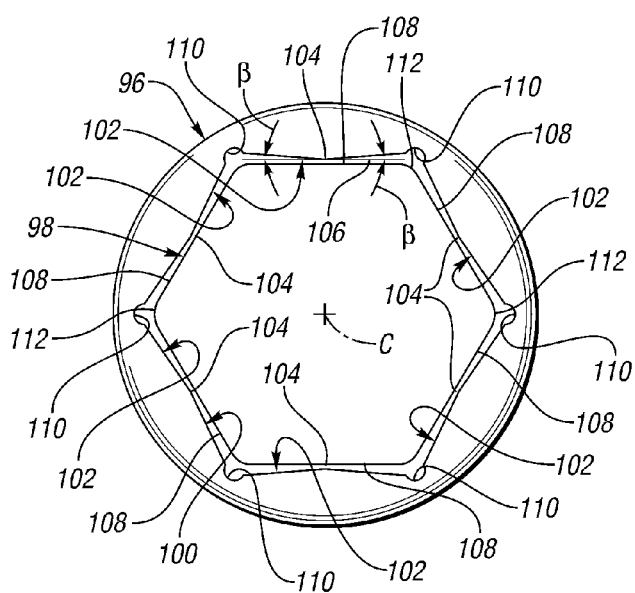
FIG. 10 is a schematic view that illustrates the construction of the female socket and the male insert of the drive coupling in the assembled condition.

The female socket 96 as shown in FIG. 8 has an interior 100 having drive faces 102 that extend parallel to the socket axis. Each drive face 102 has a peripheral central location 104 that may be either a flat as shown in FIG. 8 or a midpoint as shown in FIG. 10. From this central location 104 the drive face 102 is inclined slightly outwardly in a peripheral direction by an angle β in both clockwise and counterclockwise directions from a line 106 perpendicular to a radius from the socket axis C to its peripheral central location 104.

With reference to FIGS. 9, 12 and 13, the male insert 98 has an insert axis, which is the support axis B when mounted on the support 66 as shown. The support 66 as shown in FIGS. 5 and 7 has a drive belt 107 that is driven from a lower rotary connection on the rail 70 and drives an upper spindle on which the insert 98 is mounted so as to be rotatively driven. The insert 98 includes drive surfaces 108 which are of the same number as the number of drive faces 102 of the female socket 96. Each drive surface 108 has a straight shape as shown in FIG. 12 perpendicular to a radius from the insert axis B to a peripheral central location along its straight shape. As shown in FIG. 13, each drive surface has a round shape along the insert axis with a diameter just slightly smaller than the diameter of a circle through the peripheral central locations 104 of the drive faces 102 of the female socket so as to permit the socket to receive the insert and provide rotational driving between the socket and the insert with an acute angle α between the socket axis and the insert axis. It should be understood that the term "slightly smaller" in the preceding sentence means that there is sufficient clearance so that the male insert can be received within the female socket without binding during the rotational driving but not so great as to result in excessive backlash.

As disclosed, the female socket 96 has an even number of drive faces 102 and the male insert has an even number of drive surfaces 108, specifically the socket has six drive faces 102 forming a generally hexagonal shape and the insert has six drive surfaces 108 forming a generally hexagonal shape just slightly smaller than the hexagonal shape of the drive faces of the socket.

Figure 11:
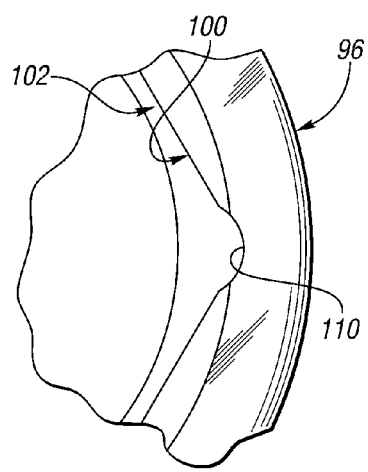
FIG. 11 is taken in the same direction as FIG. 10 and shows a portion of the female socket which has recesses between adjacent drive faces of the socket.

As best illustrated in FIGS. 10 and 11, the female socket 96 has recesses 110 located between its adjacent drive faces 102 and extending outwardly therefrom in a radial direction from the socket axis C. These recesses 110 of the female socket 96 are round, and the male insert has round junctions 112. The construction of the female socket with the round recesses 112 and the male socket with the round junctions 112 insures that there is no interference between the socket drive faces 102 and the insert drive surfaces 108 during the rotational driving. The outward inclination of the drive faces 102 from their central locations 104 as shown in FIG. 10 is necessary when the drive faces are not at the top and bottom positions when viewed as shown in FIG. 7. At the top and bottom positions, the socket would not have any interference with the insert faces 108. However, the inclination of angle α between the female socket and insert axes results in interference upon movement when not at the top and bottom positions. This interference is greater when the angle α is greater. More specifically, the angles α and β are related by the formula:

$$\beta = \text{arctangent}\left(\frac{1}{\sqrt{3}\ \text{cosine}\ \alpha}\right) - 30.$$

Furthermore, the angle α is between zero and 25 degrees, and the angle β is between zero and 2.5 degrees.

As shown in FIG. 7, the end of the inclined roller 74 connected to the drive coupling 94 has an annular ring 114 suitably secured within the metallic tube 76 of inclined roller. A retainer 116 positioned on the axial inner side of the retainer 116 is secured by a bolt 118 to the female socket 96 of the drive coupling 94 to provide the connection that permits the rotary driving of the inclined roller 74.

While an exemplary embodiment is described above, it is not intended that this embodiment describes all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An inclined roller conveying assembly for hot formed glass sheets comprising:

a pair of supports for mounting in a hot glass sheet processing system with one of the supports having a horizontal support axis and with the other support having a horizontal support and drive axis that is at a different elevation than the horizontal support axis of said one support;

a horizontally inclined roller extending between the pair of supports and having a rotational axis that is inclined from the horizontal by an angle α;

an idler bearing that rotatably mounts the inclined roller on said one support at its horizontal support axis;

a drive coupling that rotatably supports and rotatively drives the inclined roller on the other support at its horizontal support and drive axis to provide support for the lower surface of an upper portion of a hot upwardly concave formed glass sheet being conveyed;

the drive coupling including: a female socket that is mounted on either the inclined roller or said other support; and a male insert received within the socket and mounted on the other of the inclined roller or said other support;

the female socket having a socket axis about which the socket rotates and including an interior having drive faces that extend parallel to the socket axis, and each drive face having a peripheral central location from which the drive face is inclined slightly outwardly in a peripheral direction by an angle β from a line perpendicular to a radius from the socket axis to its peripheral central location; and the male insert having an insert axis about which the insert rotates and including drive surfaces of the same number as the number of drive faces of the female socket, each drive surface having a straight shape in a peripheral direction perpendicular to a radius from the insert axis to a peripheral central location along its straight shape, and each drive surface having a round shape along the insert axis with a diameter just slightly smaller than the diameter of a circle through the peripheral central locations of the drive faces of the female socket so as to permit the socket to receive the insert and provide rotational driving between the socket and the insert with an acute angle α between the socket axis and the insert axis.

2. An inclined roller conveying assembly for hot formed glass sheets as in claim 1 wherein the female socket has an even number of drive faces and wherein the male insert has an even number of the drive surfaces.

3. An inclined roller conveying assembly for hot formed glass sheets as in claim 1 wherein the female socket has six drive faces forming a generally hexagonal shape and wherein the male insert has six drive surfaces forming a generally hexagonal shape.

4. An inclined roller conveying assembly for hot formed glass sheets as in claim 1 wherein the female socket has recesses located between its adjacent drive faces and extending outwardly therefrom in a radial direction from the socket axis.

5. An inclined roller conveying assembly for hot formed glass sheets as in claim 4 wherein the recesses of the female socket are round and wherein the male insert has round junctions between its adjacent drive surfaces.

6. An inclined roller conveying assembly for hot formed glass sheets as in claim 1 wherein the angles α and β are related by the formula:

$$\beta = \text{arctangent}\left(\frac{1}{\sqrt{3}\ \text{cosine}\ \alpha}\right) - 30.$$

7. An inclined roller conveying assembly for hot formed glass sheets as in claim 1 wherein the angle α is between zero and 25 degrees, and wherein the angle β is between zero and 2.5 degrees.

8. An inclined roller conveying assembly for hot formed glass sheets as in claim 1 wherein the angles α and β are related by the formula:

$$\beta = \text{arctangent}\left(\frac{1}{\sqrt{3}\ \text{cosine}\ \alpha}\right) - 30$$

angle α being between zero and 25 degrees, and angle β being between zero and 2.5 degrees.

9. An inclined roller conveying assembly for hot formed glass sheets comprising:

a pair of supports for mounting in a hot glass sheet processing system with one of the supports having a horizontal support axis and with the other support having a horizontal support and drive axis that is at a different elevation than the horizontal support axis of said one support;

a horizontally inclined roller extending between the pair of supports and having a rotational axis that is inclined from the horizontal by an angle α;

an idler bearing that rotatably mounts the inclined roller on said one support at its horizontal support axis;

a drive coupling that rotatably supports and rotatively drives the inclined roller on the other support at its horizontal support and drive axis to provide support for the lower surface of an upper portion of a hot upwardly concave formed glass sheet being conveyed;

the drive coupling including: a female socket that is mounted on either the inclined roller or said other support; and a male insert received within the socket and mounted on the other of the inclined roller or said other support;

the female socket having a socket axis about which the socket rotates and including an interior having six drive faces that extend parallel to the socket axis, and each drive face having a peripheral central location from which the drive face is inclined outwardly in a peripheral direction by an angle β from a line perpendicular to a radius from the socket axis to its peripheral central location;

the male insert having an insert axis about which the insert rotates and including six drive surfaces each of which has a straight shape in a peripheral direction perpendicular to a radius from the insert axis to a peripheral central location along its straight shape, and each drive surface having a round shape along the insert axis with a diameter just slightly smaller than the diameter of a circle through the central locations of the drive faces of the female socket so as to permit the socket to receive the insert and provide rotational driving between the socket and the insert with an acute angle α between the socket axis and the insert axis; and the angles α and β being related by the formula:

$$\beta = \text{arctangent}\left(\frac{1}{\sqrt{3}\ \text{cosine}\ \alpha}\right) - 30.$$

10. An inclined roller conveying assembly for hot formed glass sheets comprising:

a pair of supports for mounting in a hot glass sheet processing system with one of the supports having a horizontal support axis and with the other support having a horizontal support and drive axis that is at a different elevation than the horizontal support axis of said one support;

a horizontally inclined roller extending between the pair of supports and having a rotational axis that is inclined from the horizontal by an angle α;

an idler bearing that rotatably mounts the inclined roller on said one support at its horizontal support axis;

a drive coupling that rotatably supports and rotatively drives the inclined roller on the other support at its horizontal support and drive axis to provide support for the lower surface of an upper portion of a hot upwardly concave formed glass sheet being conveyed;

the drive coupling including: a female socket that is mounted on either the inclined roller or said other support; and a male insert received within the socket and mounted on the other of the inclined roller or said other support;

the female socket having a socket axis about which the socket rotates and including an interior having six drive faces that extend parallel to the socket axis, each drive face having a peripheral central location from which the drive face is inclined outwardly in a peripheral direction by an angle β from a line perpendicular to a radius from the socket axis to its peripheral central location, and recesses located between adjacent drive faces extending outwardly therefrom in a radial direction from the socket axis;

the male insert having an insert axis about which the insert rotates and including six drive surfaces each of which has a straight shape in a peripheral direction perpendicular to a radius from the insert axis to a peripheral central location along its straight shape, each drive surface having a round shape along the insert axis with a diameter just slightly smaller than the diameter of a circle through the central locations of the drive faces of the female socket so as to permit the socket to receive the insert and provide rotational driving between the socket and the insert with an acute angle α between the socket axis and the insert axis, and round junctions between the adjacent drive surfaces; and the angles α and β being related by the formula:

$$\beta = \arctangent\left(\frac{1}{\sqrt{3}\ \cosine\ \alpha}\right) - 30;$$

and angle α being between zero and 25 degrees and angle β being between zero and 2.5 degrees.

* * * * *